(12) United States Patent
Haskell et al.

(10) Patent No.: US 8,185,161 B2
(45) Date of Patent: *May 22, 2012

(54) METHOD AND SYSTEM FOR CONTROLLING A DIRECTION OF A RECEIVE BEAM PRODUCED BY AN ANTENNA CONNECTED TO AT LEAST TWO BASE STATIONS

(75) Inventors: Philip Edward Haskell, Hampshire (GB); Paul Anthony Hickling, Worcestershire (GB)

(73) Assignee: Quintel Technology Limited, Bristol (GB)

( * ) Notice: Subject to any disclaimer, the term of this patent is extended or adjusted under 35 U.S.C. 154(b) by 677 days.

This patent is subject to a terminal disclaimer.

(21) Appl. No.: 12/201,688

(22) Filed: Aug. 29, 2008

(65) Prior Publication Data

US 2009/0075701 A1 Mar. 19, 2009

Related U.S. Application Data

(63) Continuation of application No. 10/529,589, filed as application No. PCT/GB03/04447 on Oct. 15, 2003, now Pat. No. 7,433,713.

(30) Foreign Application Priority Data

Oct. 19, 2002 (GB) .................................. 0224341.8

(51) Int. Cl.
*H04M 1/00* (2006.01)
(52) U.S. Cl. .................................................. 455/562.1
(58) Field of Classification Search ................. 455/52.1, 455/562.1
See application file for complete search history.

(56) References Cited

U.S. PATENT DOCUMENTS

| 7,433,713 B2 * | 10/2008 | Haskell et al. | 455/562.1 |
| 2006/0003808 A1 * | 1/2006 | Haskell et al. | 455/562.1 |
| 2009/0075701 A1 * | 3/2009 | Haskell et al. | 455/562.1 |

* cited by examiner

*Primary Examiner* — William D Cumming

(57) ABSTRACT

A mobile-radio base station for a telecommunications system includes vector modulator means for independently controlling the phase and/or amplitude of a plurality of component signals representative of the signal to be transmitted or received, such that when these signals pass through a plurality of antenna elements, a beam is formed in a direction according to the phase relationship of the component signals. The invention also includes interface means allowing other base stations to be coupled to the same antenna, with each base station having independent control of its beam direction. Provision is includes for phase compensation of the signals to correct for errors introduced by unequal and variable component signal path lengths between the base station and the antenna. The vector modulator means is arranged to operate at low power levels, where it can operate more efficiently.

10 Claims, 9 Drawing Sheets

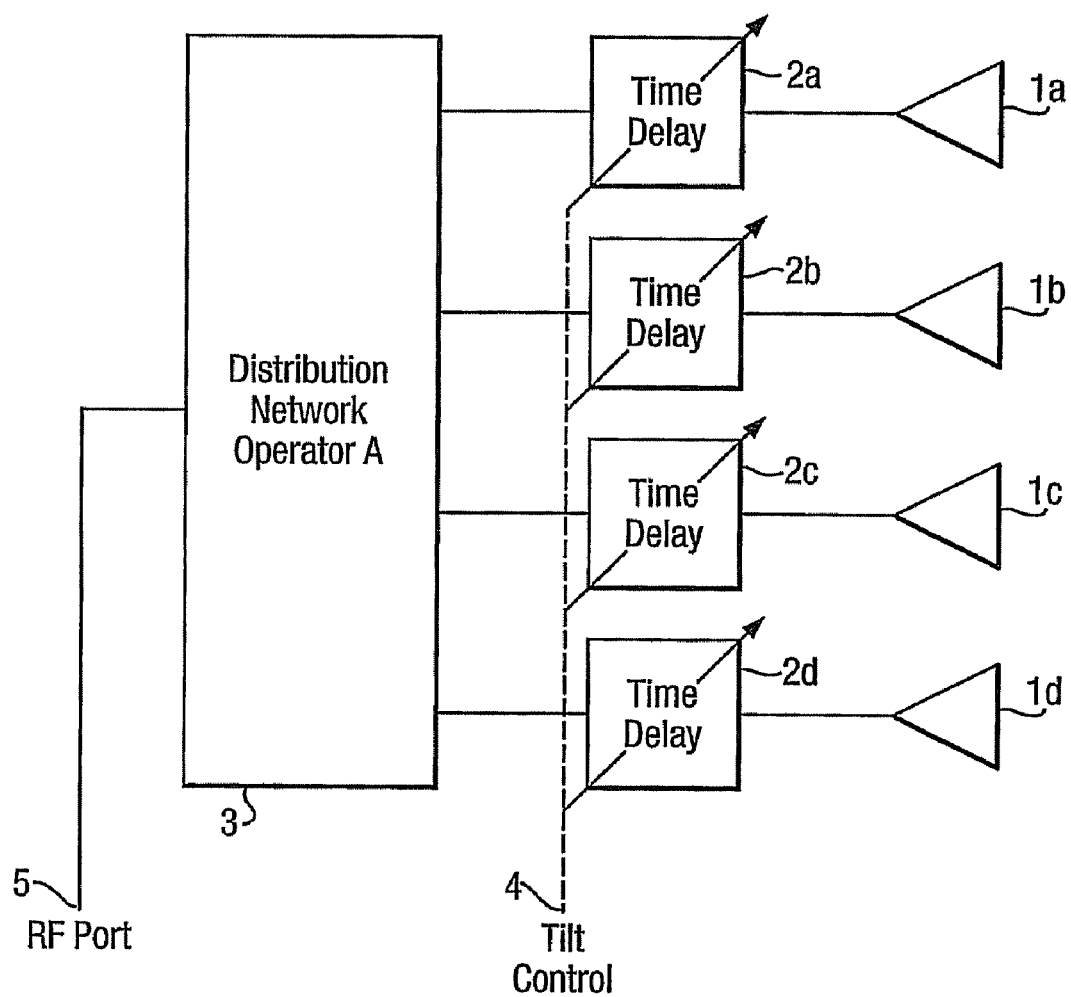

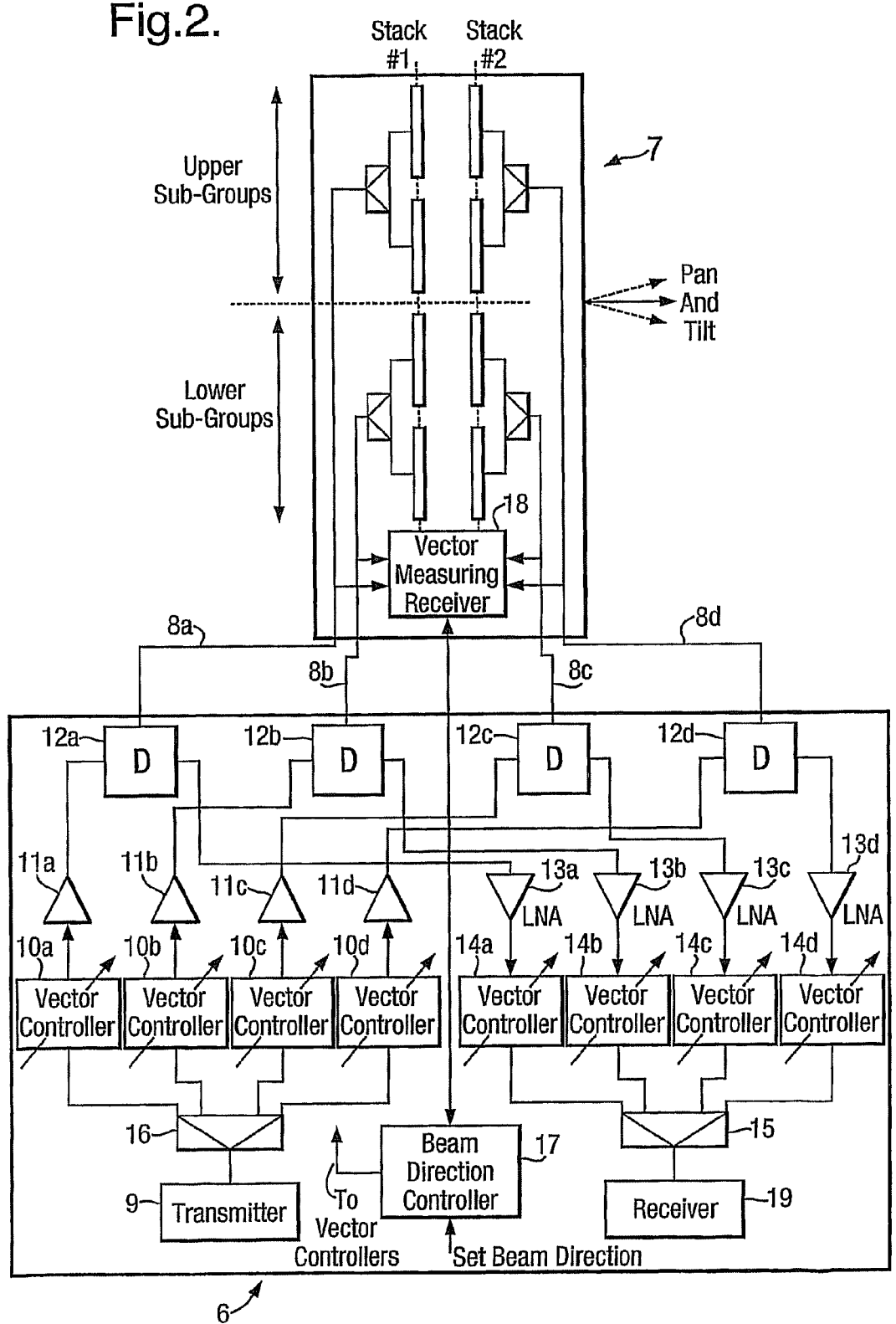

METHOD AND SYSTEM FOR CONTROLLING A DIRECTION OF A RECEIVE BEAM PRODUCED BY AN ANTENNA CONNECTED TO AT LEAST TWO BASE STATIONS

This is a continuation of U.S. application Ser. No. 10/529,589, filed on Mar. 29, 2005 and now issued as U.S. Pat. No. 7,433,713 which is a 371 application of PCT/GB03/004447, filed on Oct. 15, 2003 which claims priority to GB 0224341.8 filed on Oct. 19, 2002.

This invention relates to a mobile radio base station for use in a telecommunications system. More particularly, it relates to a mobile radio base station for use in a mobile telecommunications system made up from a plurality of base stations that are arranged to communicate to a set of mobile units, wherein the plurality of base stations make up a network of cells. The invention finds particular application in such cellular mobile networks, commonly referred to as mobile telephone networks.

Operators of cellular mobile radio networks generally employ individual base stations, each of which usually includes one or more antennas. In a cellular mobile radio network, the antenna directivity is a primary factor in setting the coverage area which is generally divided into a number of overlapping cells, each associated with a respective antenna and base station. Each cell contains a base station which communicates with mobile radios in that cell. The base stations themselves are interconnected by other means of communication, usually fixed land lines or microwave links arranged in a grid or meshed structure, allowing mobile radios throughout the cell coverage area to communicate with each other as well as with the public telephone network outside the cellular mobile radio network.

Normally associated with each base station is an antenna mast upon which the antennas are mounted. The siting of such masts is problematic, as planning permission is needed for each one, and land rental or purchase adds to the cost of the installation. There is therefore a move to share antennas and antenna sites amongst operators.

Even then, this can lead to problems. Each operator often has several antennas associated with each base station, with each antenna providing coverage of a single cell. There may be typically three or six different cells being serviced by a single base station. As the number of operators increases, each providing its own coverage in these cells, this quickly leads to an unacceptable number of discrete antennas mounted on a single mast. Furthermore, in order to avoid mutual interference, the antennas require adequate separation and the height of the mast may need to be increased, or a stronger structure may need to be used, to enable the mast to withstand high winds, thus exacerbating the problems and leading to greater expense.

A solution to this is for operators to share masts and antennas. There has been a tendency for this not to happen, due to technical and logistical problems. This can result in signals causing interference between operators, and hence have a deleterious effect on system performance.

Further, there is a need for operators to be able to adjust the angle of elevation of the boresight of the antenna, known as "tilt", for such purposes as changing the coverage area of an antenna. This is useful if the network structure is changed, for example by the addition of other base stations or antennas in the cell. This tilt may be implemented mechanically and/or electrically. "Mechanical tilt" involves physically moving the antenna radome, whereas "electrical tilt" is achieved by creating a phase shift or time delay between electrical signals sent to, or received from, different elements of the antenna.

Different operators generally have different tilt requirements, which again makes antenna sharing more problematic. Clearly, if two operators require different mechanical tilt settings they will not be able to share an antenna.

Solutions exist that comprise banks of mechanically operated phase shifters mounted within the antenna radome, that are connected to an array of antenna elements arranged as a plurality of separate antennas, with each operator having control of one antenna within the radome. In this way an operator can control the phase of its signals without affecting the signals of another operator. These suffer the common problems associated with mechanical systems—they can be slow to operate and unreliable. As they are operated in the antenna housing itself, they must also work at high powers (on transmit) or at very low powers (on receive). The use of such systems at high powers can result in the unwanted generation of intermodulation products that can de-sensitise the base station receiver.

Further solutions exist that use electrical phase shifters in the antenna housing, these phase shifters being remotely controllable, and so providing an easy to adjust beam pattern. Another problem with this approach is that any phase shifts will apply to all signals transmitted by the antenna, and all signals received by the antenna. Thus independent control of electrical tilt is not possible.

The above approach to generating a variable angle of electrical tilt may be applied to changing the beam pattern in the horizontal plane, such as may be required when an operator wishes to redirect a beam slightly to adjust cell coverage. Again, the same problems associated with the phase shifters will arise.

It is an aim of the current invention to provide an antenna interface able to provide independent control of antenna parameters that alleviate at least some of the problems of the prior art.

According to the present invention there is provided a base station for communicating signals between an operator and one or more mobile units by means of an antenna system having a plurality of radiating elements, characterised in that:
  the system is arranged to process the signals as a plurality of component signals, each component signal being associated with one or more radiating elements within the antenna system, and
  modulating means are arranged to apply complex weights to the component signals such that summation of the component signals results in the production of an antenna beam direction dependent on the value of the complex weights, and
  wherein splitting, combining, and component signal amplifying means is provided between the application of the complex weight to the component signal and the component signal passing through its associated radiating element or elements, the splitting and combining means being arranged such that it allows other operators to be connected to the same antenna system.

The invention is particularly suitable for combining independent signals from different operators, as each operator requires no knowledge of any of the signals but its own, in order to control its beam pattern. An operator can control its beam pattern—either its receive beam or its transmit beam—by means of controlling the complex amplitude (i.e. phase and/or amplitude) of the component signals Preferably the complex amplitude of the component signals is controlled by means of a vector controller (VC). This is a device that manipulates a signal by summing together amounts of in-phase and quadrature versions of itself, the amount of each decided by means of a baseband or low frequency multiplier signal, which can have a negative value. In this way, full control of the amplitude and phase of the VC output relative to the VC input is possible. However, a VC that is arranged to control, or modulate, only the phase of a signal may be used in some implementations of the invention.

Controlling the component signals in this fashion allows the electrical tilt of the beam on either transmit or receive to be tailored to the requirements of the operator, if the component signals are provided to an antenna system having spatial diversity in the vertical axis.

Likewise, the invention allows the radiation pattern to be controlled in the horizontal axis also, if component signals are arranged to be provided to an antenna system having spatial diversity in the horizontal axis.

The problems of the prior art, as discussed above, are avoided by means of this invention, as the phase and amplitude control and adjustment is done at conveniently low powers, and is performed inside the base station rather than in a separate unit or in the antenna radome. This does however mean that there is likely to be more than one connection from the antenna interface to the antenna radome, which will require a plurality of cables or other waveguides.

An antenna system suitable for use with the current invention will typically comprise an array of elements, these being accessible by the base station either individually or in subgroups.

The invention provides for the connection of a plurality of base stations to a single antenna system, such that each base station may have control of its signals' radiation pattern in either or both the horizontal or vertical axes. This is done for signals to be transmitted by means of coupling the component signals associated with a particular antenna radiating element or subgroup of elements from each base station together using power combiner means, to provide a composite component signal.

For signals that have been received by each elemental antenna element, or subgroup of elements, the signals are separated by splitting means such that each base station is provided with the received signals from the antenna elements. Each base station then filters out the signals relevant to it in the usual manner.

The splitting and combining means are preferably placed between the component signal amplification means and the antenna system.

The operation of the VC upon the component signals controls the characteristics of the beam. The vector sum of the signals transmitted from the antenna elements or sub-groups of elements form the beam on transmit, and the spacing of the antenna elements and relative phase shift of signals on the elements are factors that define the beam pattern that will be formed, in both elevation and azimuth. Other factors defining the beam pattern, such as the frequency of the signal being transmitted, will be apparent to the normally skilled person.

As the phase of the signals transmitted and received is controlled at the base station rather than the antenna as with the prior art, it is important for the phase control means to be aware of the effect of its phase control at the antenna. Embodiments of the invention may have the antenna positioned some distance from the base station, and may connect the two by means of cables, waveguides or similar structures. These can have an unpredictable effect on the component signal phases. For example, any stretching of one cable relative to another will increase the path length for that cable, and move the phase of the signal at the output of the cable. Such stretching can occur due to many reasons, such as thermal expansion etc.

An antenna as used with the current invention preferably incorporates calibration means for measuring the relative phases of signals sent to it by the base station. The calibration means would be in communication with the base station, which would then have knowledge of both the desired phase properties of the component signals, and the actual phase properties of the signals at the antenna. This then allows the effect of the connection means between the antenna and the base station to be taken into account when setting the phases in the VC. Preferably the antenna also includes as part of the calibration means a signal generation means for injecting into the receive-path of the system signals that can be measured within the basestation. The measurements taken can be used to compensate for differences in the paths taken by each of the receive-side component signals.

The calibration means is preferably in communication with all base stations connected to the antenna, such that it is able to be switched by a base station to be sensitive to the signals generated or received by that base station.

According to another aspect of the invention there is provided a method of controlling the direction of a transmit beam produced by an antenna connected to at least two base stations, the method comprising:
  in a first base station, splitting a first signal to be transmitted into a plurality of component signals;
  applying a complex weight or weights to at least one of the component signals, thereby changing the phase and/or amplitude of the component signal relative to at least one other of the component signals;
  passing the component signals to amplifying and combining means wherein the signals are brought to a power level suitable for transmission, and the component signals are combined with component signals from a second base station;
  passing the combined component signals to antenna elements or groups of elements, such that transmission by the elements causes a beam of energy representative of the first signal to be formed in a direction governed by the complex weight or weights.

According to a further aspect of the invention there is provided a method of controlling the direction of a receive beam produced by an antenna connected to at least two base stations, the method comprising:
  receiving in the antenna a plurality of component signals, each relating to a receiving element or group of receiving elements;
  separating using splitting and filter means the component signals intended for a first base station, and amplifying said component signals using amplification means;
  applying a complex weight or weights to at least one of the component signals in the first base station, thereby changing the phase and/or amplitude of the component signal relative to at least one other of the component signals;
  combining the component signals in a beamformer in the first base station to produce a receive beam formed in a direction governed by the complex weight or weights.

The invention will now be described in more detail, by way of example only, with reference to the accompanying drawings, in which:

FIG. 1 illustrates in block diagrammatic form a method of the prior art for controlling the angle of electrical tilt;

FIG. 2 illustrates in block diagrammatic form one embodiment of the current invention for controlling the beam direction using vector controllers within a base station;

Figure 3A:
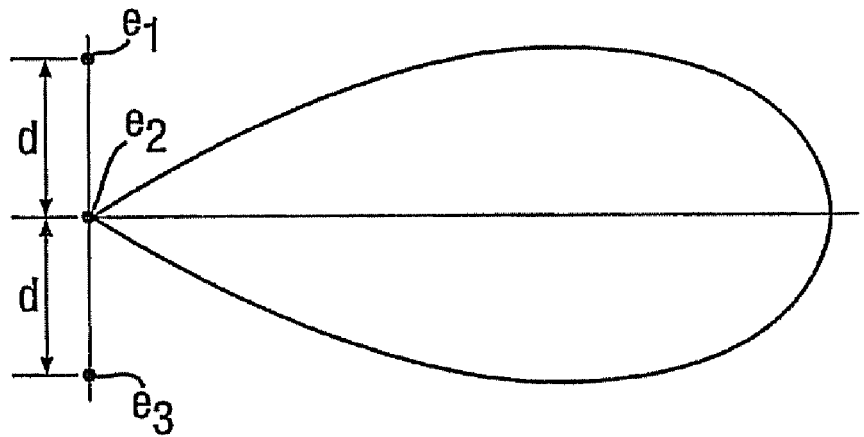
FIG. 3 illustrates the concept of applying phase shifts to signals feeding an array in order to control the beam characteristics.

FIG. 1 shows a method of the prior art for controlling the radiation beam direction for a mobile radio base station system. The method implements a variable delay system in the antenna radome. Here, four channels are shown, each having an antenna element 1 connected to a means 2 for controlling the electrical length of the feed to each element 1. The electrical length controller 2 implements a variable time delay in the individual signal paths, such that signals traversing each path are all shifted in time by variable amounts. The path lengths are set by a tilt control section (not shown), that provides a tilt control signal 4. The signals are split (in the Transmit case) or combined (in the Receive case) for a single operator A in the distribution network 3. A single, collective input/output 5 is supplied to the distribution network 3 from the base station (not shown). If the antenna elements 1 are stacked vertically, then appropriate changing the relative delays of the signals on the antenna elements 1 using the delay structure 2 will result in tilting of the beam pattern. This tilt will occur on all signals, so if the antenna were to be shared between two or more users, individual control of tilt would not be possible.

FIG. 2 shows a block diagram of one embodiment of the current invention. A mobile radio base station system 6 according to the current invention is shown connected to an antenna system 7. The connection comprises four cables 8a, 8b, 8c, 8d. Each of the four cables 8 carry signals in both transmit mode and receive mode. The transmit signals are generated by a transmitter 9. The output of the transmitter is split up into four equal component signals, and each is fed into a respective vector controller, or phase modulator, 10. The modulators 10 are able to adjust the relative phase of their input signals such that each output of the modulator may be at a different phase. The component signals from the phase modulators 10 are then amplified in a power amplifier stage 11 and sent through duplexers 12, and through the cables 8 to the antenna system 7. The base station system 6 includes a splitter/combiner network (not shown) used to allow other operators to connect their base stations to the same antenna system.

The base station system 6 has receive equipment comprising a set of low noise amplifiers (LNAs) 13 that each receive component signals from the antenna 7 via the cable structure 8 and duplexers 12. The LNAs then pass the signal to vector controller, or modulator, circuits 14, the outputs of which go to a summer 15, to produce a single, beamformed output following well-known phased array principles. This passes into the receiver 19 where it is processed in the conventional manner. Note that in this embodiment the receiver 19 and the transmitter 9 are state of the art items, and would need no significant changes from those currently employed in base station applications. Note also that the number of component signals along with their associated amplifiers and modulators for both transmit and receive shown in this embodiment has been limited to four for clarity—in practice there may be more or less than this.

The antenna 7 is similar to antennas used in prior art systems in terms of the radiating element layout. However, whereas existing antennas will combine the signals from the individual radiating elements into a single exit port (or sometimes a single port for a particular polarisation), an antenna used with the current invention will provide access to either individual radiating elements or to small groups of radiating elements such that by applying signals of differing phase to the individual elements or subgroups of elements, the beam pattern will be controlled.

In transmission, the embodiment of FIG. 2 operates as follows. Data required for transmission is configured as an input signal entering the transmitter 9, which up-converts the signal to a transmission frequency. The output of the transmitter is a low power signal. The up-converted signal is then split into (in this example) four component signals by the splitter 16. Each signal output from the splitter 16 is fed into the vector modulator circuits 10. The modulators 10 are able to adjust the phase and amplitude of the component signal relative to the other component signals. Modulators 10a and 10b are arranged to co-operate such that they control the angle of electrical tilt of the signal transmitted from stack #1 of the antenna, and modulators 10c and 10d are arranged to co-operate such that they control the angle of electrical tilt of the signal transmitted from stack #2 of the antenna. In practice, these angles would generally be the same. Similarly, the angle of boresight of the transmitted signal may be controlled by setting ah appropriate phase angle between 10a and 10d, and between 10b and 10c. At this point the component signals are at relatively low power levels, and therefore it is possible to fabricate a high performance vector modulator circuit 10 relatively cheaply and easily. The vector modulators 10 are under the control of the beam direction controller 17. The outputs of the vector modulators 10 are fed to power amplifier circuits 11 which amplify the component signals to the correct levels for transmission. The amplified component signals are then fed via duplexers 12 and the cable structure 8 to individual antenna elements in the antenna 7, which radiate the signal energy into free space. The relative phases of the component signals control the beam pattern of the resulting composite beam. The duplexers prevent the transmitted signal from interfering with the receive side of the base station.

The receive side of FIG. 2 works in a similar fashion. The component signals received by the antenna elements within the antenna 7 pass individually from the antenna 7 to the mobile base station system 6, via the cabling structure 8, where they are fed into duplexers 12, which filter out signals at the transmit frequencies and leave just those at the receive frequencies. The component signals are then individually amplified in low noise amplifiers 13. Thus components that follow the LNA 9 need not be critical in terms of their noise performance, as the noise figure of the system will be largely governed by the LNA 13, the antenna 7 and related cabling 8. The output from each LNA 13 is passed to the vector modulators 14, which, as described above, control the phase and amplitude of the component signals relative to each other, itself under the control of the beam direction controller 17. The phase and amplitude adjusted signals are then vectorially added together using a combiner 15, which has the effect of defining a receive beam. The combined receive signal is then passed to the receiver 19 where it is then dealt with in a conventional manner.

The antenna 7 of FIG. 2 has installed a vector measuring receiver (VMR) 18, which is able to selectively switch its input to any of the transmit signals being transmitted, and measure characteristics of that signal. This is desirable in this embodiment, as the antenna 7 is often mounted some distance from the base station 6, and the cabling structure 8 can be long enough to distort the phases of the signals passed between the antenna 7 and the base station 6. For example, small temperature differences between the cables will cause their relative lengths to change due to thermal expansion, and hence will create a phase error between component signals. The purpose of the VMR 17 is therefore to measure the individual phases at the antenna, and relay the results of the measurement to the base station. The results are received at the beam direction controller (BDC) 17 where the actual phases at the antenna are compared to the phases as set by the BDC 17. Any error in the phases caused by the transmission up through the cables 8 can then be cancelled out.

This can be further enhanced such that the receive path can be calibrated. To do this, a signal is injected into each of the receive paths in the antenna housing, such that it produces a set of component signals having a known phase relationship. The properties of these signals may be measured using the receiver 19 or using a separate, dedicated receiver, within the basestation, and the result used to compensate for any phase errors using the vector modulators 14. Use of a dedicated receiver for this means that the regular operation of the other receivers is not affected.

Figure 3B:
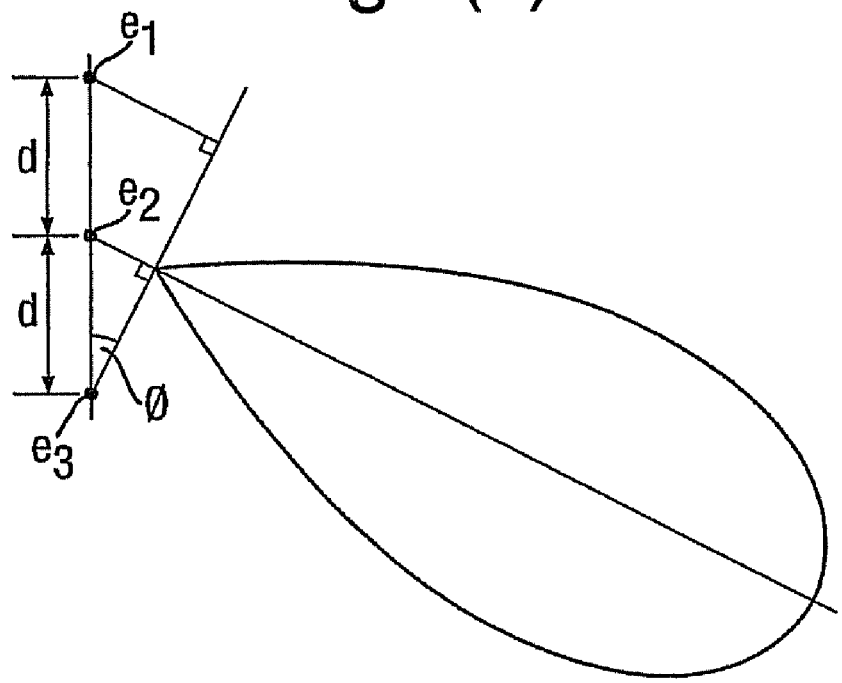

Note that the embodiment of FIG. 2 shows an embodiment that controls the beam pattern in a single polarisation governed by the arrangement of the antenna elements. The embodiment is however not restricted to operation in a single polarisation, but could instead be adapted to have independent control of beam patterns of orthogonal polarisations. This would involve having separate feeds to orthogonal antennas, with these feeds being driven by suitably weighted component signals as per the embodiment of FIG. 2. The versatility of the system may therefore be increased by increasing the number of component signals, and using these to control different aspects of the beam The phases of the component signals required to get a particular beam pattern on both transmit and receive are calculated by the beam direction controller. This has knowledge of the transmission frequency, and also the physical characteristics of the antenna. FIG. 3a shows a vertical stack of elemental antennas $e_1$, $e_2$, $e_3$ that are individually driven. If the component signals supplying each elemental antenna e all have a zero relative phase difference then the resultant beam will be transmitted from the array with no skew—i.e. it will be transmitted in the direction normal to the plane of the antenna array. If a relative phase shift of θ rad is applied between component signals supplying successive pairs of antenna elements e with total phase shift increasing cumulatively across the array, then the beam will be directed off from the normal by an angle φ rad, given by $$\mathrm{Sin}\phi = \frac{\theta\lambda}{2\pi d} \qquad \text{Eqn. 1}$$

where λ is the wavelength of the signal being transmitted, and d is the separation between antenna elements. Such a skewed beam is shown in FIG. 3b.

Equation 1 applies whether the antenna elements are mounted horizontally or vertically, and so applies to both the boresight and the angle of electrical tilt.

Figure 4:
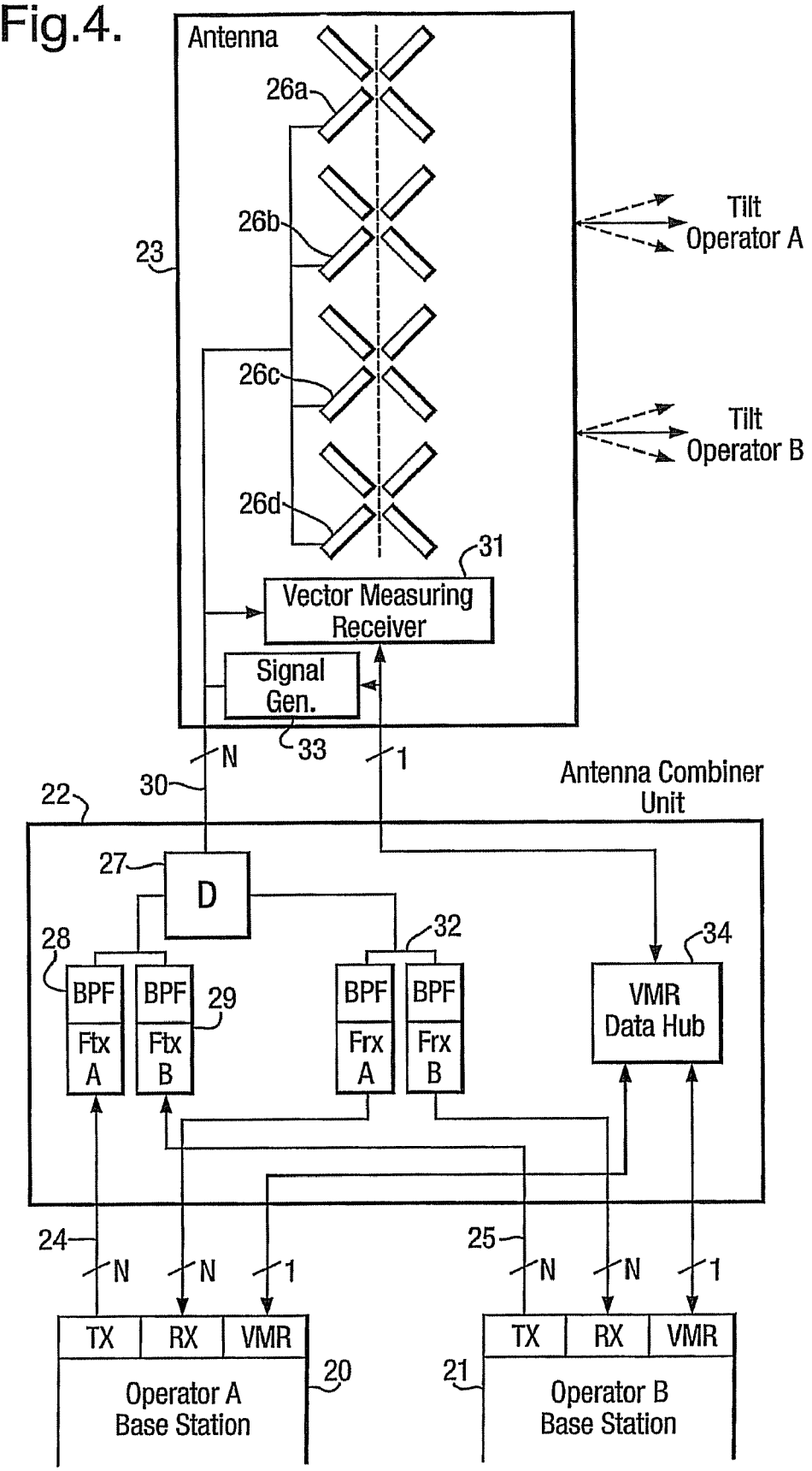
FIG. 4 illustrates in block diagrammatic form the invention being used to couple two operators to a single antenna.

FIG. 4 shows an embodiment of the invention arranged to connect more than one base station to a single antenna, while still allowing each base station to have independent control of its beam pattern, both in terms of angle of electrical tilt, and beam boresight. Two base stations 20, 21 are shown connected to a single antenna 23 by means of an Antenna Combiner Unit (ACU) 22. Each base station 20, 21 is of the type shown in FIG. 2 above, and each operate on different frequencies. The base station 20 of operator A has a plurality of transmit lines 24, each corresponding to a component signal, and each designed to be transmitted from a single antenna element or group of elements. The component signals on the lines 24 have been suitably modulated in phase and amplitude to achieve a desires angle of electrical tilt. The base station of operator B has a similar set of lines 25 that are again modulated to achieve its desired angle of electrical tilt—not necessarily equal to that required by operator A. Each of the sets of lines 24, 25 from both operators are then combined together in the ACU 22. This is done by first band pass filtering each individual component line 24, 25 in a filter 28, 29 having a characteristic that allows its signals to pass but blocks the signals of other operator. The component signals from each operator that are intended for the same antenna element or group of elements 26 can then be connected together without causing mutual interference to each other's signals. The combined component signals are then passed into a duplexer 27, which uses filters to prevent the transmit signals from interfering with the receive signals (assuming they are on different frequencies). The combined component signals are then sent via cabling 30 to the antenna elements 26 and transmitted.

A similar process happens in reverse for the receive signals for both operators A and B, wherein a plurality of component signals from the antenna elements 26 are passed via the cabling 30 through to the duplexer 27 and individually filtered to separate out one operator's signals from those of the other operator. The filtered component signals are then passed to the appropriate base station where they are combined using vector controllers as described in relation to FIG. 2 above.

The combined component signals 30 also go to a vector measuring receiver (VMR) 31 that is able to measure the phase and amplitude of each of the component signals for each operator. At any one time, the VMR 31 is under the control of the VMR data hub 34, which is itself under the control of one of the base stations 20, 21, which tells the receiver 31 which component signal to measure. The data from this measurement is then sent to the base station where it may be used to apply complex weight corrections to the component signals. Likewise, the receive path, comprising of the cabling 30, duplexer 27, filters 32 and associated cabling may be calibrated by inserting a signal into each component signal path using a switchable signal generator 33, and measuring the signals in the basestation 20 or 21. Again, these measurements can be used to apply complex weight corrections for the received component signals. The signal generator 33 is also under the control of the VMR data hub 34.

As the modulation of the component signals is done independently by each operator on the base station side of the ACU 22, each is able to control its own beam pattern without having, any adverse effect on the beams formed by the other operator. Of course, the normally skilled person will realised that other splitting/combining means may be employed, such as by using, as appropriate, a network of passive splitters/combiners and filters. Some methods may be more suitable than others, depending on factors such as the difference in frequency between signals transmitted from connected base stations.

Figure 5:
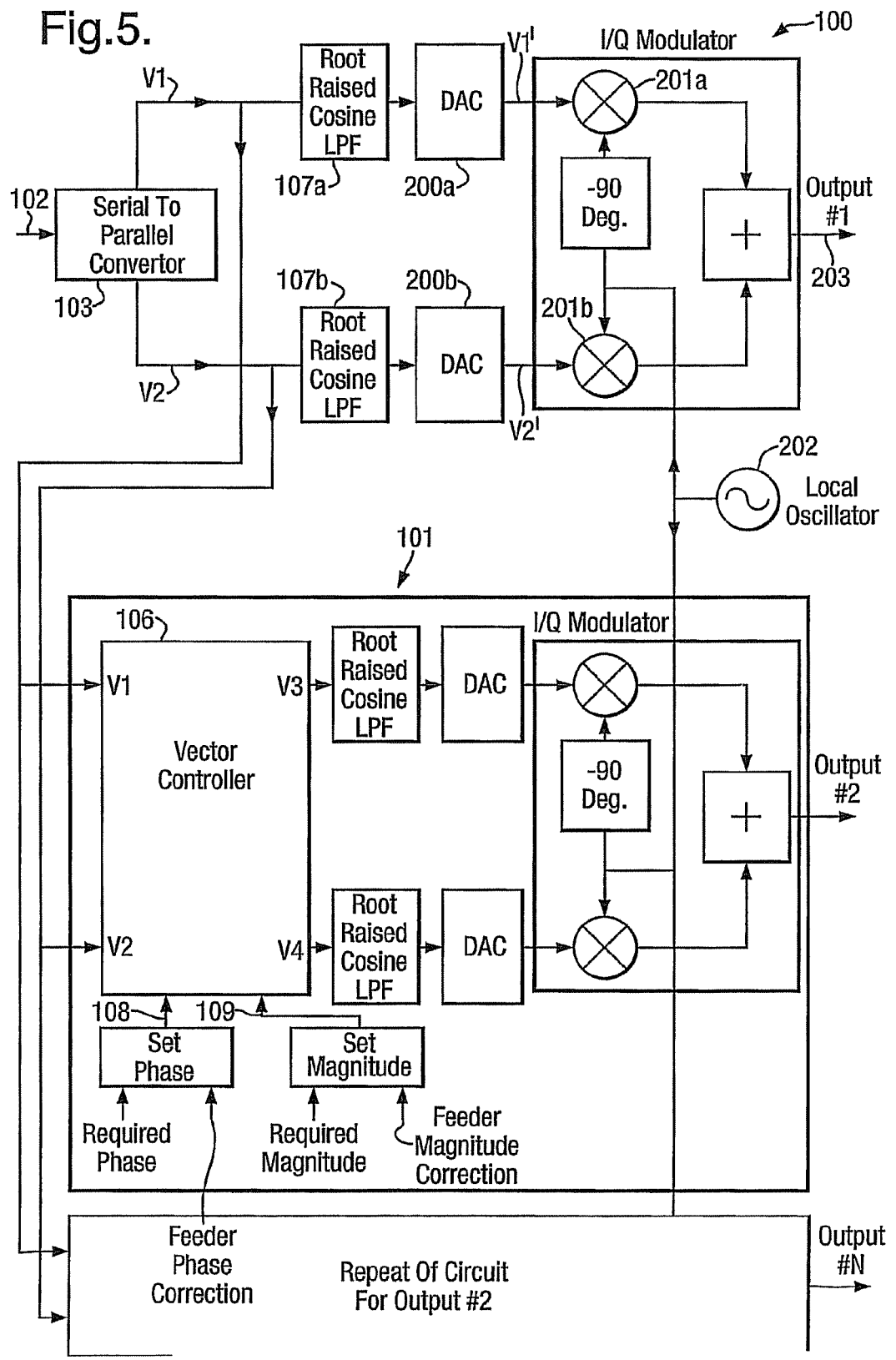
FIG. 5 illustrates in block diagrammatic form detail of a base station modulator that incorporates a vector controller, as used in the baseband transmit-side circuitry of the current invention.

FIG. 5 shows in detail one method used to control the component signals such that a beam may be controlled. This particular implementation shows a transmit vector controller being used to control the phases of the component signals at a low frequency. The Figure shows detail of two component signal modulators 100, 101. The second channel 101 is a generalised modulator incorporating a vector controller, and can be repeated for use with subsequent channels.

The modulator 100 comprises a serial to parallel converter connected to a pair of low pass filters 107, each feeding into a digital to analogue converter (DAC) 200. The analogue output of each DAC 200 goes into a mixer circuit 201. The other input to each mixer 201 is from a local oscillator 202. A phase shift of −90° is applied to one of the signals from the local oscillator 202 to one of the mixers 201. The output of the mixers 201 are summed to produce a modulated RF output 203. This RF output 203 may be at the transmission frequency, in which case the signal is then passed to an RF amplifier, or it may be at an intermediate frequency (IF), in which case it will undergo a further mixing stage to take it up to the transmission frequency.

Note that the modulator 100 does not have a facility for phase shifting its component output. The output of this modulator 100 is therefore the reference output. Modulator 101 is similar to modulator 100 except that it has a vector controller 106 incorporated to control the phase of the output.

The operation of the modulator 100 will now be described. The data to be transmitted enters the modulator as a serial binary stream 102. This is input to a serial to parallel converter 103 which generates two signals V1, V2 each representing part of the binary stream 102. V1 and V2 are both at half of the bit rate of binary stream 102. Each signal is filtered using a root raised cosine low pass filter 107 to improve spectral efficiency before being converted to an analogue signal V1', V2'. Note that the presence, and exact type of this filtering is dependent on the particular application the base station is being used for.

The filtered signals are then converted to analogue signals, so that they can be mixed up to RF frequencies. This is done in an I-Q modulator, with the first signal V1' being mixed with a sinusoid, and the signal V2' being mixed with a sinusoid separated in phase by 90° from the first. Both resultant signals are then summed to create a single modulated component signal.

Modulator 101 works in a similar way, except it incorporates a vector controller 106. This vector controller 106 works in the digital domain, and takes as its input the same information as used by modulator 100, namely signals V1 and V2. It also takes two control signals, these being a phase control 108 and an amplitude control 109. The outputs of the vector controller 106 are two signals V3 and V4, these being given by:

$$V_3 = K[V_1 \cos \phi - V_2 \sin \phi]  \quad \text{Eqn. 2}$$

$$V_4 = K[V_1 \sin \phi + V_2 \cos \phi]  \quad \text{Eqn. 3}$$

The phase of V3 and V4 is adjusted by the vector controller such that when the two signals are combined in the I-Q modulator, the combined signal has a phase suitably adjusted for forming a desired beam.

Modulator 101 is replicated as necessary for each remaining component signal. Although the minimum number of component signals making up the overall signal to be transmitted is two, finer control of the beam pattern can be achieved with more than this, but at added cost and system complexity. In practice between two and five are likely to be used. All modulators 100, 101 etc. are fed with a local oscillator (LO) signal 202 derived from the same reference source, and the path from the LO to each I-Q modulator is preferably phase matched. However, if the paths are not phase matched, the phase error can be corrected by applying a suitable phase correction weighting in each of the vector controllers 106.

The phase control signal 108 and amplitude control signal 109 that are input to the vector controller 106 are each derived from two main input signals. The phase control signal 108 is calculated from the required phase, as decided by the Beam Direction Controller, but this is offset by a feeder phase correction signal which comes from a Vector Measuring Receiver (VMR) mounted in the antenna system itself. In this way the errors introduced by varying lengths of the line to the antenna are corrected. This mechanism can also be used to correct for any phase errors in the LO feed signal to each of the I-Q modulators. Likewise, the amplitude control signal 109 is derived from both a magnitude signal from the Beam Direction Controller, and a correction signal from the VMR.

Figure 6:
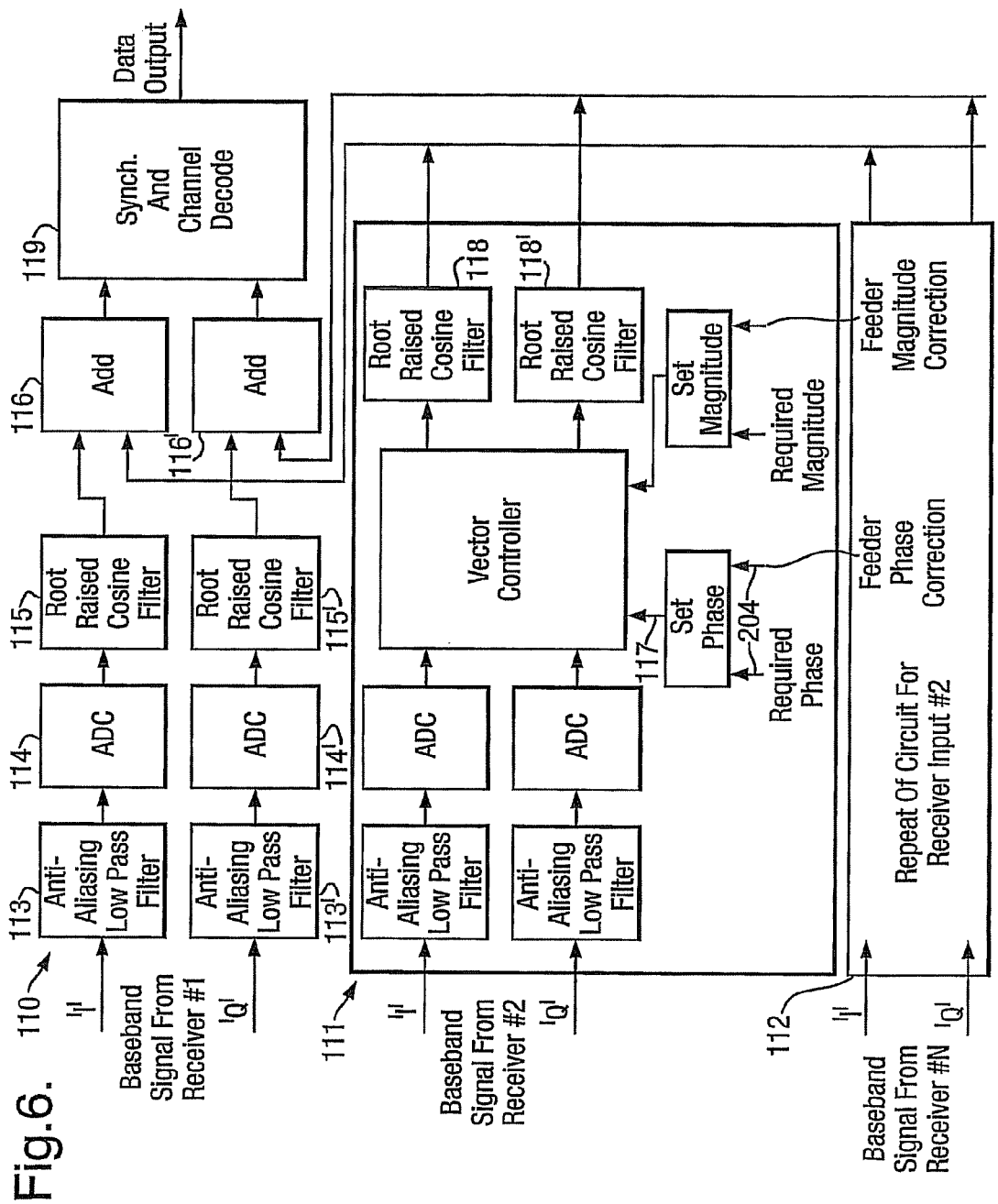
FIG. 6 illustrates in block diagrammatic form detail of a base station demodulator that incorporates a vector controller as used in the baseband receive-side circuitry of the current invention.

FIG. 6 shows an embodiment of the receive-side beamformer implemented at low frequencies. Three channels are shown, 110, 111, 112. Each of these receive I and Q data from a separate receiver (not shown). Each receiver deals with the signals from a single antenna element or group of elements, and so processes a single component signal. The receivers' I and Q channels are digitised using Analogue to Digital Converters (ADCs) 114 114', after being filtered using anti-alias filters 113, 113'. Channel 110 is a reference channel, and so no phase or amplitude modulation need be applied to its I and Q signals. Following digitisation therefore the I and Q signals are filtered in root-raised cosine filters 115, 115' before being input to adders 116, 116'.

Channel 111 is similar to channel 110 except for the addition of a vector controller 117 that is able to modulate the phase and/or amplitude of the I and Q channels input to it. The phase and amplitude is governed by inputs 204 which comprise the required phase value as derived from the theory discussed above, along with any required correction due to unequal path lengths etc. The outputs of the vector controller 117, i.e. the appropriately phase shifted I and Q channels of one of the component signals, are then filtered using root-raised cosine filters 118, 118' before being fed as another input to the adders 116, 116'.

Further channels 112 are provided for processing remaining component signals. In practice, it is likely that the number of channels on receive will equal the number of modulators on transmit.

The outputs of the adders 116, 116' are the receive beams for the I and Q parts of the received signal respectively. These are then decoded in the normal manner in decoder 119.

Figure 7:
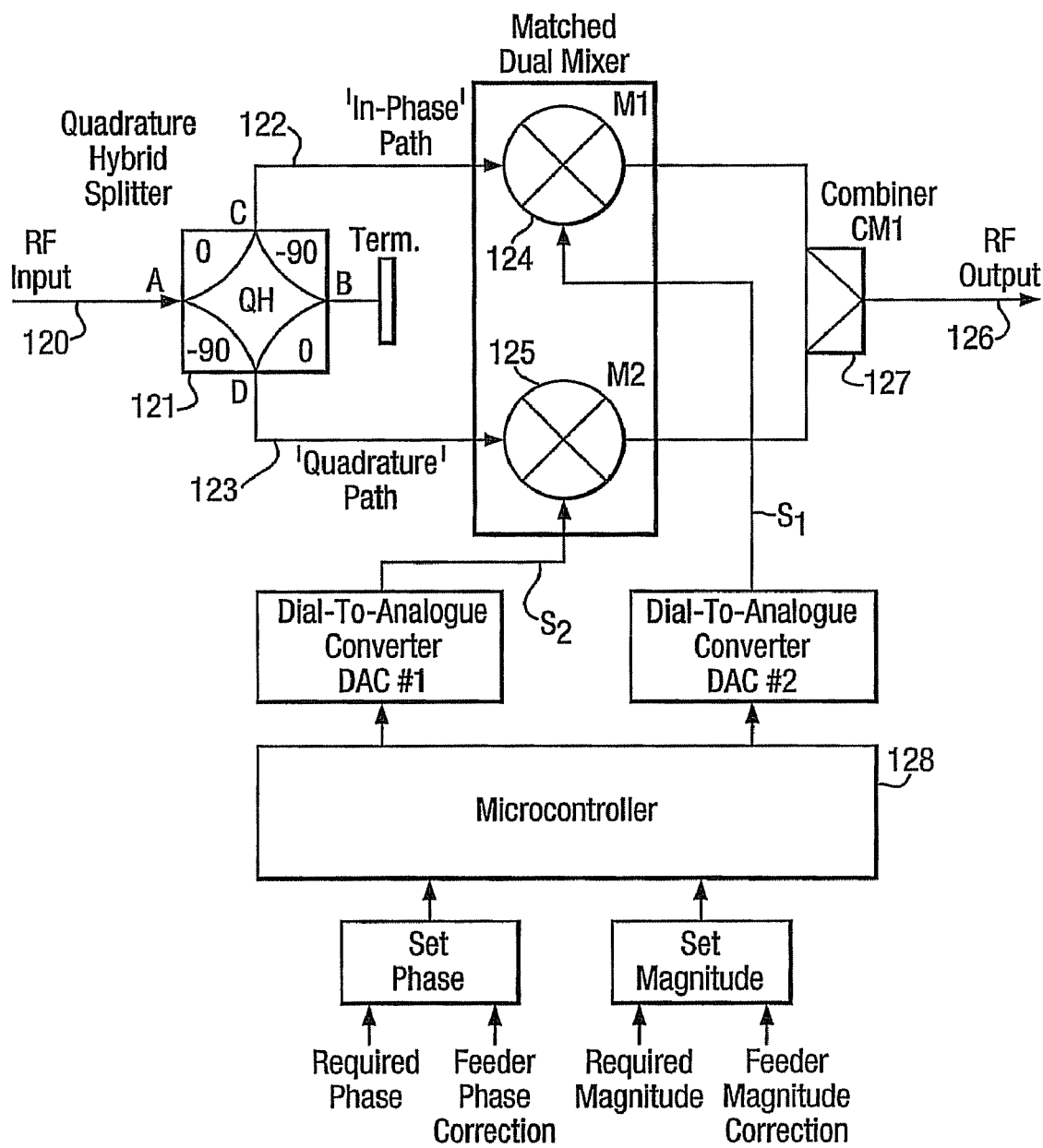
FIG. 7 illustrates in block diagrammatic form detail of a vector controller as employed in another embodiment of the current invention, where processing is performed at RF frequencies.

FIG. 7 shows an alternate to the above embodiments, wherein the phase shifting and beamforming is done at RF frequencies rather than at low frequencies. In particular, FIG. 7 shows a component signal vector controller that may be used in the transmit or receive path of a base station. Looking at the transmit side, an RF signal 120 that has been suitably modulated with the information to be transmitted is input to a quadrature hybrid 121. This splits the input 120 up into two useful components—an "in-phase" signal 122, and a "quadrature" signal 123. Each of these signals 122, 123 is then applied to a multiplier 124, 125. The other inputs to each of the multipliers 124, 125 are signals $S_1$, $S_2$ derived from the required phase and magnitude of the component signal. These signals $S_1$, $S_2$ are bipolar signals, and by appropriate choice of $S_1$ and $S_2$, the component signal S(t) 126 at the output of combiner 127 can be set to an arbitrary phase and amplitude. The modulator of FIG. 7 implements the equation:

$$S(t)=S_1 \cos(2\pi ft)+S_2 \sin(2\pi ft) \quad \text{Eqn. 4}$$

where S(t) is the output signal, and the input signal has frequency f Hz. S(t) can therefore have arbitrary phase depending on the values of $S_1$ and $S_2$. $S_1$ and $S_2$ are calculated by the microcontroller 128, based on the same inputs as used in the vector controller shown in FIG. 5. Two DACs are used to convert the digital outputs of the microcontroller 128 to analogue form suitable for use by the multipliers 124, 125.

Figure 8:
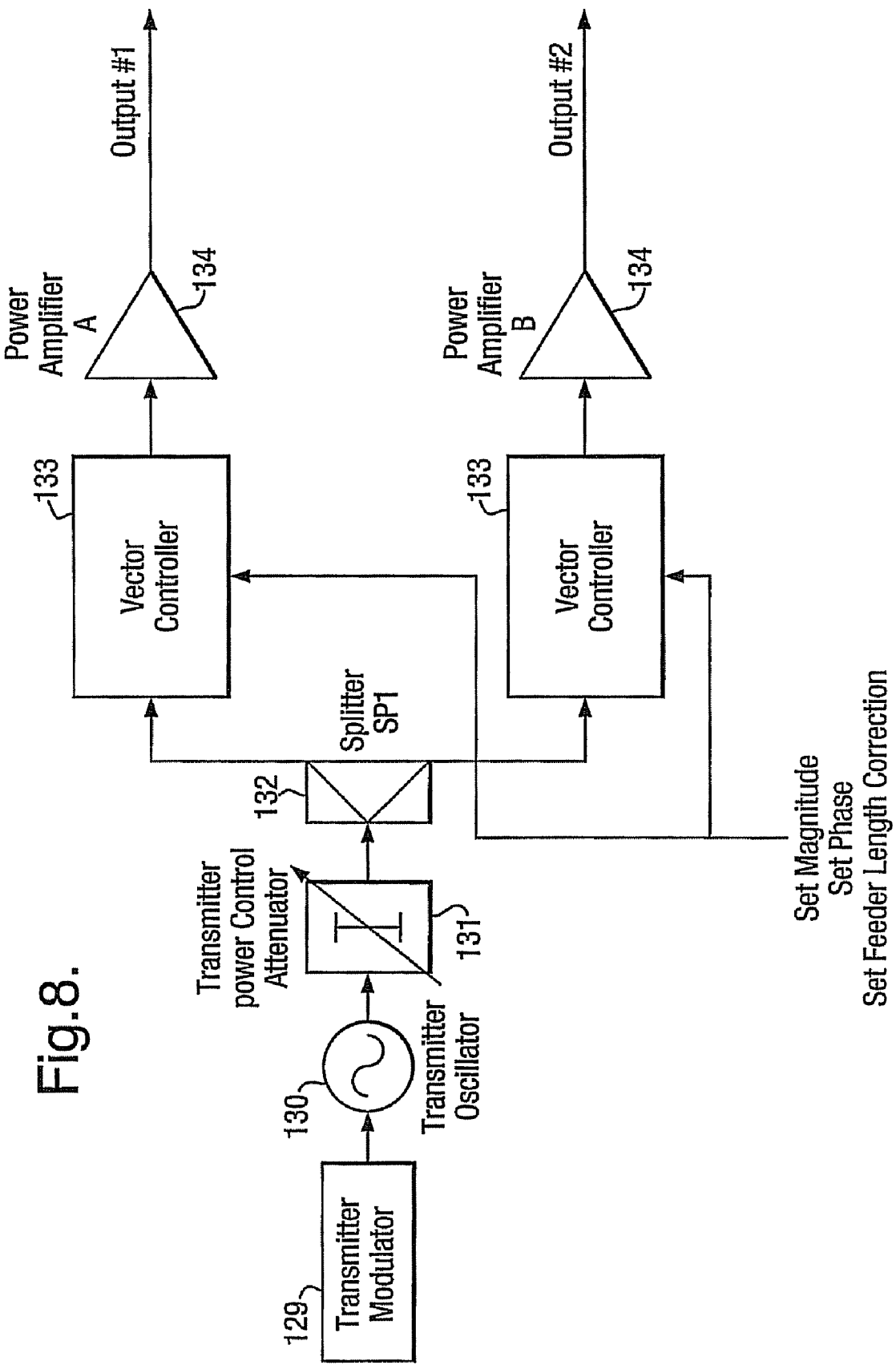
FIG. 8 illustrates in block diagrammatic form details of an embodiment of the current invention, where processing is performed at RF frequencies for generation of a transmit beam.

FIG. 8 shows how the vector controller of FIG. 7 is embodied in the transmit section of a base station of the current invention. The transmitter modulator 129, oscillator 130 and power control attenuator 131 generate an RF signal in the same manner as an ordinary base station. The RF signal is then split in splitter 132 to generate component signals. A two way splitter 132 is shown, but in practice there may be more, in order to provide finer control of the beam pattern. Each of the component signals is then modulated using the vector controller 133 as detailed above in relation to FIG. 7, before being amplified using power amplifier 134 to a level suitable for transmission. Each component signal will then be appropriately phase shifted relative to each other such that when they are fed to the appropriate antenna elements and transmitted, a beam is formed having the desired characteristics.

Figure 9:
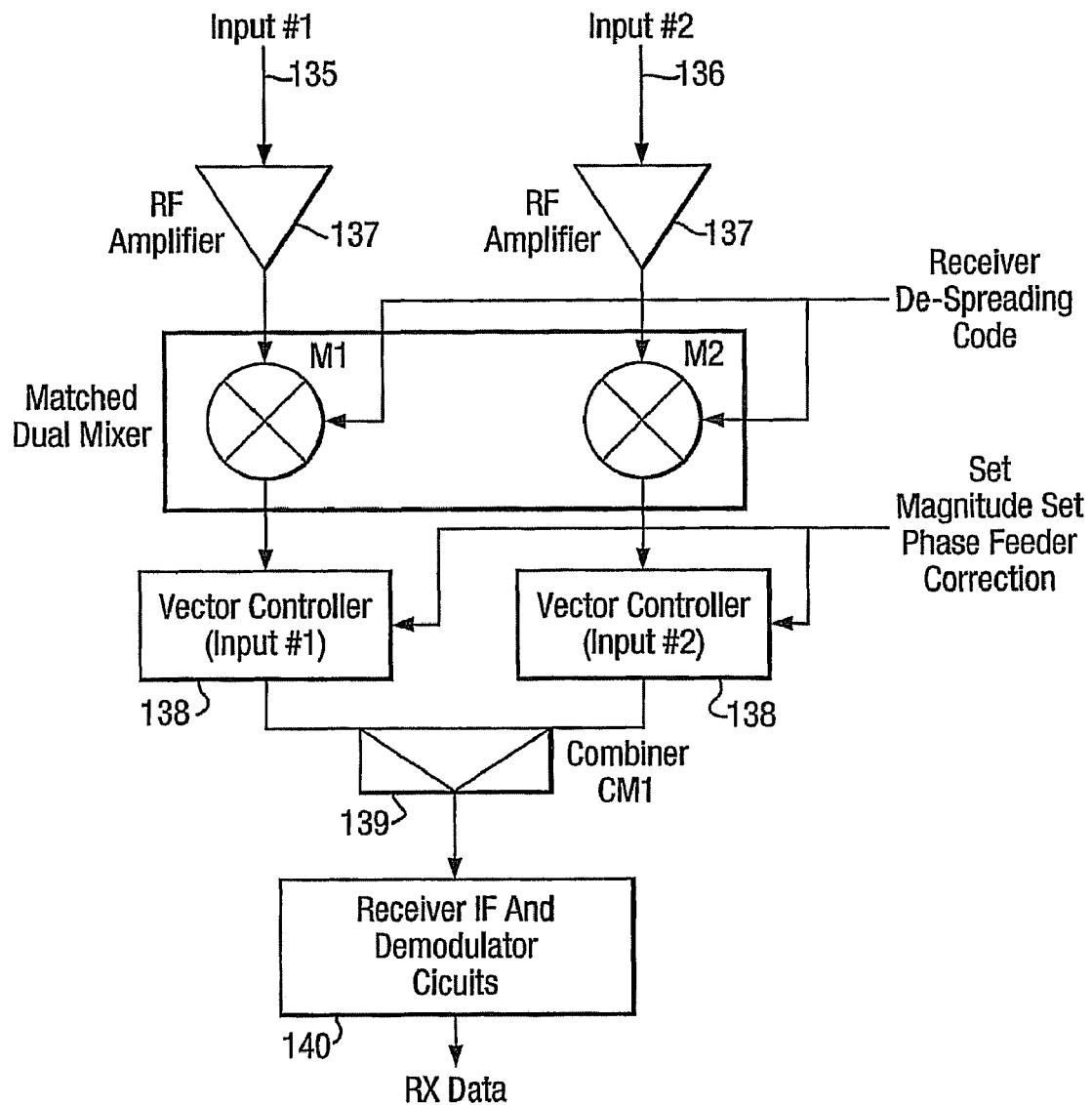
FIG. 9 illustrates in block diagrammatic form details of an embodiment of the current invention, where processing is performed at RF frequencies for generation of a receive beam.

FIG. 9 shows how the vector controller of FIG. 7 is embodied in the receive section of a base station of the current invention. This particular embodiment is adapted for use in a CDMA, "third generation" system. Two inputs 135, 136 are shown, each of which comes from an antenna element or group of elements, via any splitting arrangements used to couple other operators to the antenna, and duplexers used to separate the transmit signal from the receive signal. Each input 135 136 is first amplified in a low noise amplifier 137 before being multiplied by a de-correlation code that acts to reduce the incoming bandwidth. Performing the de-correlation before the beamforming improves the system noise figure, and so presents a better signal to the phase modulators. Each de-correlated signal is then passed to a vector controller 138, which adjust the phases of the component signals as described in relation to FIG. 7. The outputs of the vector controllers 138 are then vectorially summed in the combiner 139, this summing process forming the receive beam. The resultant signal is then processed by the IF and demodulator circuitry 140 in the usual way.

The skilled person will be aware that other embodiments within the scope of the invention may be envisaged, and thus the invention should not be limited to the embodiments as herein described.

The invention claimed is:

1. A system for communicating signals between an operator and one or more mobile units via an antenna system having a plurality of radiating elements, the system comprising:
    a processor adapted to process the signals as a plurality of component signals, each component signal being associated with at least one radiating element within the antenna system, and
    a modulator adapted to apply complex weights to the component signals such that a summation of the component signals results in a production of an antenna beam direction dependent on a value of each of the complex weights;
    wherein a splitter, a combiner, and a component signal amplifier are provided between the modulator and the plurality of radiating elements, the splitter being in a receive signal path, and the combiner being in a transmit path wherein the splitter and combiner are configured to connect component signals from a first base station with component signals from a second base station, simultaneously to the antenna system.

2. The system of claim 1 wherein the modulator is arranged to apply the complex weights to the component signals at a component signal frequency lower than a component signal frequency of the component signals that are passed to the antenna system.

3. The system of claim 1 wherein the modulator is arranged to apply the complex weights to the component signals at a component signal frequency substantially the same as a component signal frequency of the component signals that are passed to the antenna system.

4. The system of claim 1 wherein the modulator comprises vector controllers.

5. The system of claim 4 wherein the vector controllers are arranged to control a relative phase of each component signal.

6. The system of claim 4 wherein the vector controllers are arranged to control an amplitude of each component signal.

7. A method of controlling a direction of a transmit beam produced by an antenna connected to at least two base stations, the method comprising:
    in a first base station, splitting a first signal to be transmitted into a plurality of component signals;
    applying at least one complex weight to at least one of the plurality of component signals, thereby changing at least one of a phase or an amplitude of the at least one of the plurality of component signals relative to at least one other of the plurality of component signals;
    passing the plurality of component signals to amplifying means wherein the plurality of component signals are brought to a power level for transmission;
    combining the plurality of component signals from the first base station with component signals from a second base station using a combining means to produce combined component signals;
    passing the combined component signals to antenna elements of the antenna, such that a transmission by the antenna elements causes a beam of energy representative of the first signal to be formed in a direction governed by the at least one complex weight.

8. The method of claim 7 wherein the component signals from the second base station are independent from the component signals from the first base station.

9. A method of controlling a direction of a receive beam produced by an antenna connected to at least two base stations, the method comprising:
    i) receiving in the antenna a plurality of component signals, each of the plurality of component signals relating to a receiving element, and passing the plurality of component signals to splitting and filter means via a plurality of feeder cables;
    ii) separating using the splitting and filter means a subset of the plurality of component signals intended for a first base station from the plurality of components signals, and amplifying the subset of the plurality of component signals using amplification means;

iii) applying at least one complex weight to at least one of the subset of the plurality of component signals in the first base station, for changing at least one of a phase or an amplitude of the at least one of the subset of the plurality of component signals relative to at least one other of the subset of the plurality of component signals;

iv) combining the subset of the plurality of component signals in the first base station to produce a receive beam formed in a direction governed by the at least one complex weight;

v) repeating steps ii to iv in a second base station independently of the first base station.

10. A system for communicating signals between an operator and one or more mobile units via an antenna system having a plurality of radiating elements, the system comprising:

a processor adapted to process the signals as a plurality of component signals, each component signal being associated with at least one radiating element of a plurality of radiating elements within the antenna system, and a modulator adapted to apply complex weights to the component signals such that a summation of the component signals results in a production of an antenna beam direction dependent on a value of each of the complex weights;

wherein a splitter, a combiner, and a component signal amplifier are provided between the modulator and the plurality of radiating elements, the splitter being in a receive signal path, and the combiner being in a transmit path wherein the splitter and combiner are configured to connect a plurality of base stations simultaneously to the antenna system.

* * * * *